US009235006B2

(12) United States Patent
Frisken et al.

(10) Patent No.: US 9,235,006 B2
(45) Date of Patent: Jan. 12, 2016

(54) OPTICAL CHANNEL MONITOR

(75) Inventors: Steven James Frisken, Vaucluse (AU);
Dmitri Abakoumov, Bondi (AU)

(73) Assignee: Finisar Corporation, Horsham, PA (US)

( * ) Notice: Subject to any disclaimer, the term of this patent is extended or adjusted under 35 U.S.C. 154(b) by 131 days.

(21) Appl. No.: 13/460,883

(22) Filed: May 1, 2012

(65) Prior Publication Data

US 2012/0281982 A1  Nov. 8, 2012

Related U.S. Application Data

(60) Provisional application No. 61/483,500, filed on May 6, 2011.

(51) Int. Cl.
*H04B 10/08* (2006.01)
*G02B 6/293* (2006.01)
*G02B 6/27* (2006.01)
*G02B 6/35* (2006.01)

(52) U.S. Cl.
CPC ........ *G02B 6/29313* (2013.01); *G02B 6/29385* (2013.01); *G02B 6/272* (2013.01); *G02B 6/2793* (2013.01); *G02B 6/2931* (2013.01); *G02B 6/29307* (2013.01); *G02B 6/29373* (2013.01); *G02B 6/29397* (2013.01); *G02B 6/356* (2013.01)

(58) Field of Classification Search
None
See application file for complete search history.

(56) References Cited

U.S. PATENT DOCUMENTS 6,327,019 B1  12/2001  Patel et al.
7,253,897 B2   8/2007  Moon et al.
(Continued)

FOREIGN PATENT DOCUMENTS

CN  1797062 A     7/2006
WO  03/032071 A1  4/2003
WO  2004/005993 A1 1/2004

OTHER PUBLICATIONS

"Partial European Search Report" for EP12166290.2-1524, Sep. 3, 2012, 6 pages, The European Patent Office, Berlin, Germany.
(Continued)

*Primary Examiner* — Ken Vanderpuye
*Assistant Examiner* — David Lambert
(74) *Attorney, Agent, or Firm* — Kurt Rauschenbach; Rauschenbach Patent Law Group, LLC

(57) ABSTRACT

Described herein is an optical channel monitor (100), including a plurality of input ports in the form of optical fibers (102) disposed in a vertical "port displacement" dimension. Each fiber (102) inputs a respective optical beam (103) having a plurality of individual wavelength channels. A lens (104) collimates each beam and converges the beams in the port displacement dimension to a focal plane (105). The collimated and converged beams are incident onto a rotatable micro-electromechanical system (MEMS) mirror (106), which selectively directs each optical beam onto a wavelength dispersion element in the form of a grism (108) at a predetermined angle (denoted by φ) in a horizontal "dispersion" plane. The grism (108) spatially separates, in the dispersion plane, the wavelength channels contained within each optical beam (103) by diffraction. The angle at which each channel is diffracted is controlled by the angle φ.

18 Claims, 13 Drawing Sheets

(56) References Cited

U.S. PATENT DOCUMENTS

| | | |
|---|---|---|
| 2002/0071627 A1 | 6/2002 | Smith et al. |
| 2002/0093660 A1* | 7/2002 | Maeda ............................ 356/450 |
| 2002/0131691 A1 | 9/2002 | Garrett et al. |
| 2002/0154855 A1* | 10/2002 | Rose et al. ........................ 385/24 |
| 2006/0067611 A1* | 3/2006 | Frisken et al. ................... 385/16 |
| 2006/0140536 A1* | 6/2006 | Aota et al. ........................ 385/18 |
| 2007/0242953 A1* | 10/2007 | Keyworth et al. ............... 398/48 |
| 2007/0264010 A1 | 11/2007 | Bartolini |
| 2008/0085119 A1 | 4/2008 | Ye et al. |
| 2008/0218872 A1* | 9/2008 | Yuan et al. ..................... 359/663 |
| 2009/0040615 A1* | 2/2009 | Koeppen et al. ............... 359/566 |
| 2009/0067054 A1 | 3/2009 | Koeppen et al. |
| 2009/0110349 A1 | 4/2009 | Presley et al. |
| 2009/0303562 A1* | 12/2009 | Koeppen et al. ........... 359/212.1 |
| 2010/0046944 A1* | 2/2010 | Wagener et al. ................ 398/34 |

OTHER PUBLICATIONS

"Supplementary Search Report" for EP 05749258.9-2217/1766819, Jan. 21, 2013, European Patent Office, Munich, Germany.

"European Search Report" for EP 12166290, Jan. 21, 2013, 8 pages, European Patent Office, Berlin, Germany.

"Office Action", Chinese Patent Application No. 201210135914.X, Aug. 5, 2015, 10 Pages, State Intellectual Property Office of People's Republic of China, Beijing, P.R. China.

* cited by examiner

OPTICAL CHANNEL MONITOR

CROSS-REFERENCE TO RELATED APPLICATIONS

The present application is a non provisional of copending U.S. Provisional Patent Application Ser. No. 61/483,500, filed on May 6, 2011. The entire contents of U.S. Patent Application Ser. No. 61/483,500, is herein incorporated by reference.

FIELD OF THE INVENTION

The present invention relates to the monitoring of signals in an optical transmission system. In particular the invention provides an optical channel monitor for monitoring individual wavelength channels of a wavelength division multiplexed (WDM) signal.

While some embodiments will be described herein with particular reference to that application, it will be appreciated that the invention is not limited to such a field of use, and is applicable in broader contexts.

BACKGROUND

Any discussion of the background art throughout the specification should in no way be considered as an admission that such art is widely known or forms part of common general knowledge in the field.

Optical channel monitors are used in optical communications to monitor various characteristics of individual wavelength channels throughout a network. In wavelength division multiplexed (WDM) systems, multiple channels having different wavelengths are transmitted as a single combined signal. However, there are various optical phenomena that effect optical beams on a wavelength-dependent basis. Such effects include chromatic dispersion and wavelength dependent loss in optical materials. Therefore, it is beneficial to monitor the characteristics of each channel as it propagates through the optical system.

Traditional optical channel monitors can provide an inventory of incoming and outgoing channels and some devices can report on each channel's power and peak central wavelength. Some optical channel monitors include diffraction gratings for spatially separating individual wavelength channels from a WDM signal. Conventional channel monitors use imaging systems having a controlling lens to image a beam at a particular focal point. While these systems are relatively simple in design, the controlling lens necessarily has a large focal length in order to provide good spectral performance. As the scale size of the overall system scales roughly with the focal length, optical channel monitors implementing imaging systems are typically large in size. This is often disadvantageous in optical systems where scale size is an important consideration.

US Patent Application Publication 2009/0303562 (Koeppen et al.) entitled "High-Resolution Spectrally Adjustable Filter" discloses an optical channel monitor including a tiltable reflector such as a MEMS mirror and a diffraction grating for angularly separating individual wavelength channels. This device implements a non-imaging system wherein the optical beam remains essentially collimated throughout the system and is not focused at a point. Koeppen et al provides for a smaller scale size device as there is no focal length limitation to the location of the optical elements. However, such a non-imaging system substantially increases the complexity of design, particularly when multiple input/outputs are used. Furthermore, in this arrangement the size of the tiltable reflector and diffraction grating scales proportional to the number of inputs and outputs in the system.

SUMMARY OF THE INVENTION

It is an object of the invention, in its preferred form, to provide an improved optical channel monitor.

In accordance with a first aspect of the present invention there is provided an optical channel monitor including:

a plurality of input ports disposed in a first dimension, each input port being adapted for transmitting an optical beam including a plurality of individual wavelength channels;

an optical power element for collimating each optical beam and for angularly converging the beams, in the first dimension, to a focal plane;

a wavelength dispersion element for spatially separating the wavelength channels of each optical beam in a second dimension;

a selectively movable spatial manipulation element for selectively directing each optical beam onto the wavelength dispersion element at a predetermined angle in the first dimension; and a plurality of output ports for receiving and outputting at least one predetermined spatially separated wavelength channel of each optical beam for detection of one or more characteristics of each predetermined channel;

wherein the input ports and wavelength dispersion element are disposed at or substantially adjacent corresponding focal planes of the optical power element such that a predetermined wavelength channel of each optical beam is simultaneously coupled to a predetermined output port.

The wavelength dispersion element is preferably a reflective grism. The grism is preferably oriented with respect to the spatial manipulation element such that a surface area of the wavelength dispersion element that is illuminated by an optical beam in the second dimension remains substantially constant upon movement of the spatial manipulation element.

The spatial manipulation element is preferably disposed at a position in a converging focal path of the optical power element wherein the spatial separation of the optical beams is reduced. At least a subset of the output ports preferably include optical detectors and optical slits.

The spatial manipulation element is preferably selectively rotatable to selectively sweep the wavelength channels across the output port in the second dimension. More preferably the spatial manipulation element is driven at a predetermined frequency to periodically sweep each channel in the second dimension. Preferably the spatial manipulation element is selectively rotatable to selectively couple wavelength channels into a desired output port in the first dimension. The spatial manipulation element is preferably a micro-electro-mechanical (MEMS) mirror.

The optical channel monitor preferably includes an optical receiver coupled to each output port for receiving a predetermined wavelength channel and detecting one or more predetermined characteristics of that channel.

Each input port preferably includes a respective micro-lens for reducing the divergence and increasing the radial width of each incident optical beam.

According to a second aspect of the invention there is provided a method of monitoring an optical channel including the steps of:

receiving a plurality of optical beams spatially disposed in a first dimension, each beam including a plurality of individual wavelength channels;

collimating each optical beam and angularly converging the beams, in the first dimension, to a focal plane;

selectively directing each optical beam at a predetermined angle in the first dimension;

spatially separating the wavelength channels of each optical beam in a second dimension; and simultaneously receiving and outputting at least one predetermined spatially separated wavelength channel of each optical beam for detection of one or more characteristics of each predetermined channel.

According to a third aspect of the invention there is provided an optical signal monitoring device for monitoring characteristics at predetermined wavelengths of an optical input signal, the device including:

at least one input port projecting a first input optical signal having multiple channels encoded as different wavelengths;

an optical power element, angularly converging the projected optical signal in a first switching dimension and collimating the projected optical signal in a second dispersion dimension, thereby producing an optical power element output signal;

a dispersion element dispersing the different wavelengths of the optical power element output signal in said second dispersion dimension, thereby producing a dispersion element output signal;

an output signal monitoring element monitoring the optical power of at least one wavelength of the dispersion element output signal.

The optical signal monitoring device preferably also includes a variable transmission direction element modifying the projection direction of the optical power element output signal in a controlled manner thereby causing different wavelengths to be emitted onto the output signal monitoring element.

The variable transmission direction element preferably comprises a rotatable mirror. The dispersion element preferably includes a grism having a diffraction grating formed on a first surface, with the optical power element signal being diffracted by the diffraction grating after transmission through the grism.

Reference throughout this specification to the terms "optical beam" are intended to mean, and be used synonymously with the terms "optical signal" to describe the WDM signal to be monitored by the optical channel monitor. Reference is particularly made to "optical beam" as the WDM signal is often described in terms of spatial characteristics and propagation, which, for ease of understanding, is more clearly described by the term "beam" rather than "signal". However, it will be appreciated that such "optical beams" include the wavelength information and propagation characteristics indicative of a transmitted optical signal.

It will also be appreciated that the term "optical" used in this specification is not intended to restrict the notion of optical beams and beams being in the visual range of electromagnetic waves. Rather, the term "optical" is used to refer to any range of electromagnetic waves that can be controlled and manipulated in the appropriate manner by the described optical channel monitor. Such electromagnetic waves generally include, but are not limited to infrared, visual, and ultra-violet wavelengths.

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression "a device comprising A and B" should not be limited to devices consisting only of elements A and B. Any one of the terms including or which includes or that includes as used herein is also an open term that also means including at least the elements/features that follow the term, but not excluding others. Thus, including is synonymous with and means comprising.

BRIEF DESCRIPTION OF THE DRAWINGS

Preferred embodiments will now be described, by way of example only, with reference to the accompanying drawings in which.

DETAILED DESCRIPTION

Figure 1:
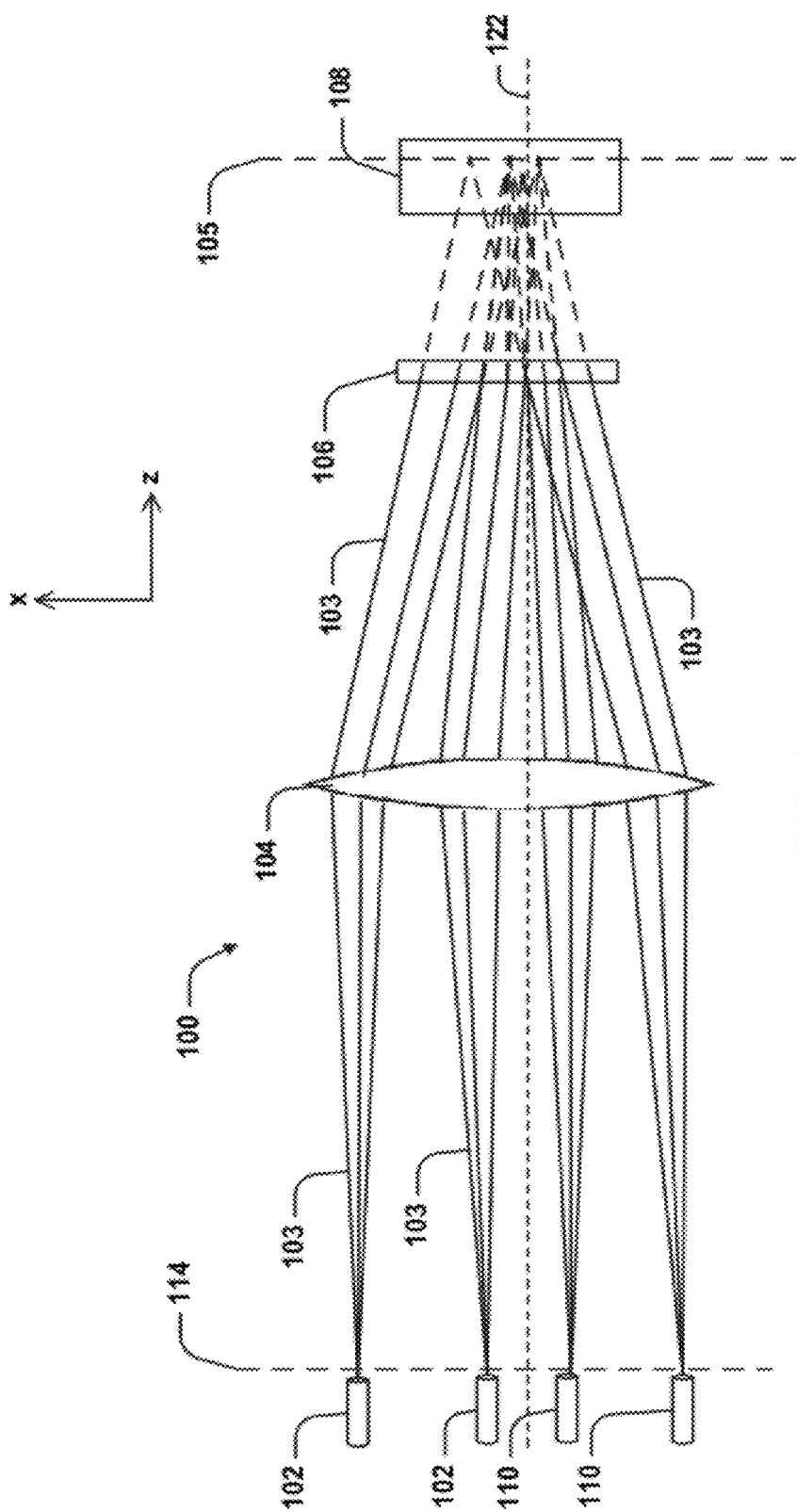
FIG. 1 is a schematic side view of the optical channel monitor according to a first embodiment, showing the MEMS mirror as a transmission element for simplicity.

Throughout the description of the various embodiments, corresponding features have been given the same reference numerals.

Referring initially to FIG. 1 there is described schematically an optical channel monitor 100 for monitoring properties of a wavelength channel in an optical transmission system. The optical channel monitor 100 is configured to be coupled to an existing optical transmission network through, for example, an optical coupler.

The channel monitor 100 includes a plurality of input ports in the form of optical fibers 102 disposed in a vertical "port displacement" dimension (x-axis). Each fiber 102 inputs a respective optical beam 103 having a plurality of individual wavelength channels. By way of example, an optical beam may be a dense wavelength division multiplexed (DWDM) signal having a plurality of wavelength channels equally spaced apart in frequency by 50 GHz. The signals 103, in the form of optical beams, are transmitted through an optical power element in the form of a lens 104, which collimates each beam and converges the beams in the port displacement dimension to a focal plane 105. The collimated and converged beams are incident onto a selectively movable spatial manipulation element in the form of a rotatable micro-electromechanical system (MEMS) mirror 106. For ease of understanding, mirror 106 is shown in FIG. 1 as a transmission element. However, as will be described and illustrated below, this mirror acts to reflect the optical beams 103 in a predetermined direction.

Figure 2:
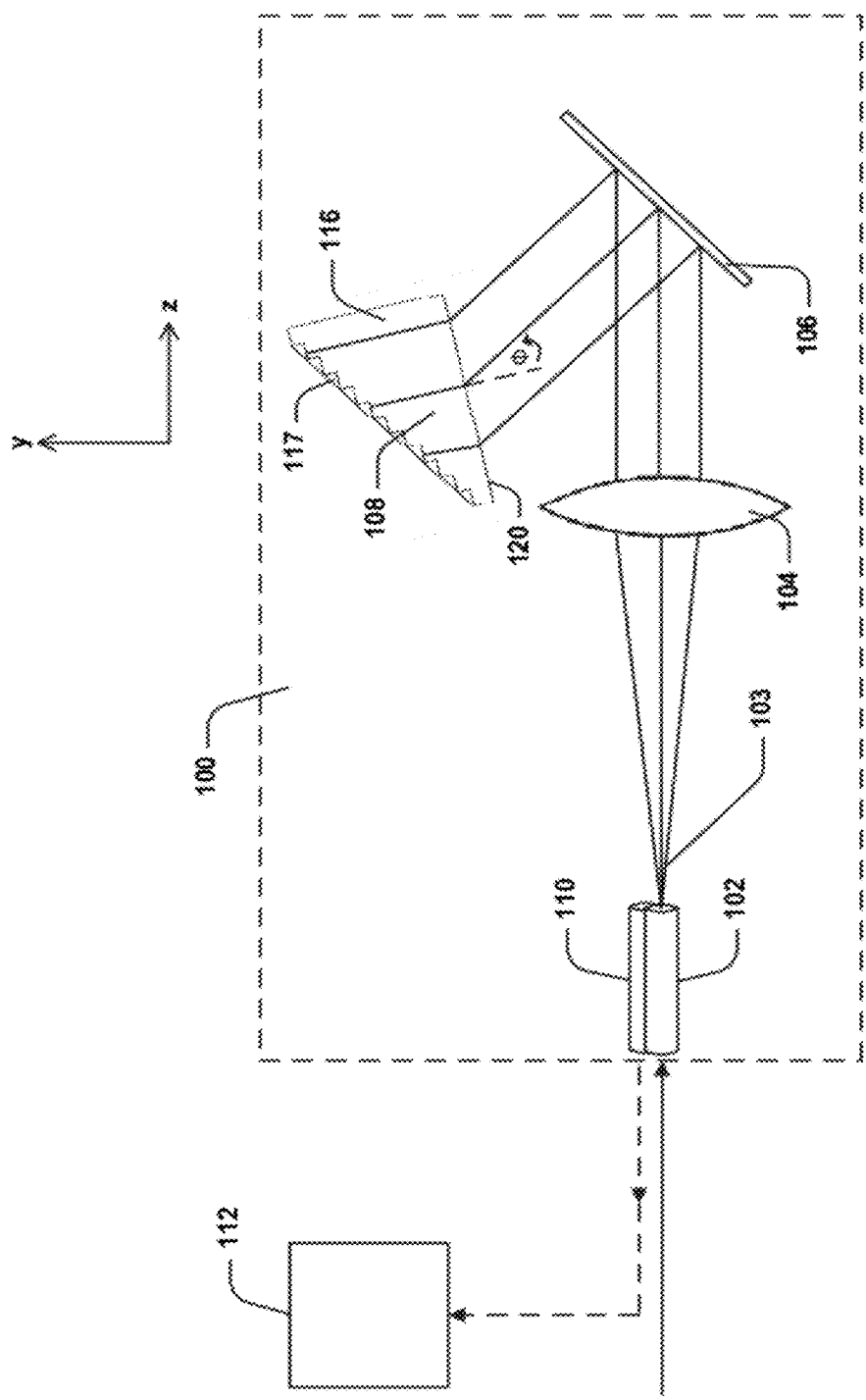
FIG. 2 is a schematic plan view of an optical channel monitor according to the first embodiment.

Referring now to FIG. 2, a plan view of the optical channel monitor of FIG. 1 is shown. The MEMS mirror 106 selectively directs each optical beam onto a wavelength dispersion element in the form of a grism 108 at a predetermined angle (denoted by $\phi$) in a horizontal "dispersion" plane (y-axis). The grism 108 spatially separates, in the dispersion plane, the wavelength channels contained within each optical beam 103 by diffraction. The angle at which each channel is diffracted is controlled by the angle $\phi$.

At certain orientations of the MEMS mirror 106, at least one of the spatially separated wavelength channels is diffracted by the grism 108 along substantially the same path as the input beam 103, thereby coupling that beam back through the optical system to a predetermined output fiber 110 where at least one channel is coupled into each fiber 110 for detection and monitoring by a receiver 112. The receiver, which includes an optical detector such as an avalanche photodiode and associated processing components, detects one or more characteristics of the channel such as the channel peak power and the central wavelength of the channel.

Referring again to the side view of FIG. 1, the input ports 102, output ports 110 and grism 108 are uniquely disposed at or substantially adjacent corresponding focal planes 114, 105 of the lens 104 such that one or more predetermined wavelength channels of each optical beam 103 are simultaneously coupled to a predetermined output port or ports. Specifically, in the horizontal dispersion plane, the optical beams are focused into the input and output ports and collimated onto the grism 108, while in the vertical port displacement plane the optical beams 103 are collimated and converged onto the grism 108 and also focused into the input/output ports 102 and 110.

This symmetric configuration allows the MEMS mirror 106 to be positioned in the converging focal path of the lens 104 wherein the spatial separation of the optical beams is reduced. This necessarily reduces the required size of mirror 106. Further, the symmetric imaging system allows the monitor to include a large number of input and output ports without scaling up the size of the system.

For ease of understanding the wavelength dispersing operation of a single optical beam input into the optical channel monitor will first be described. The concepts will then be extended to describe the operation of the channel monitor having multiple inputs and outputs, and to outline the important advantages that the disclosed optical channel monitor provides in relation to monitoring multiple signals simultaneously.

Figure 3:
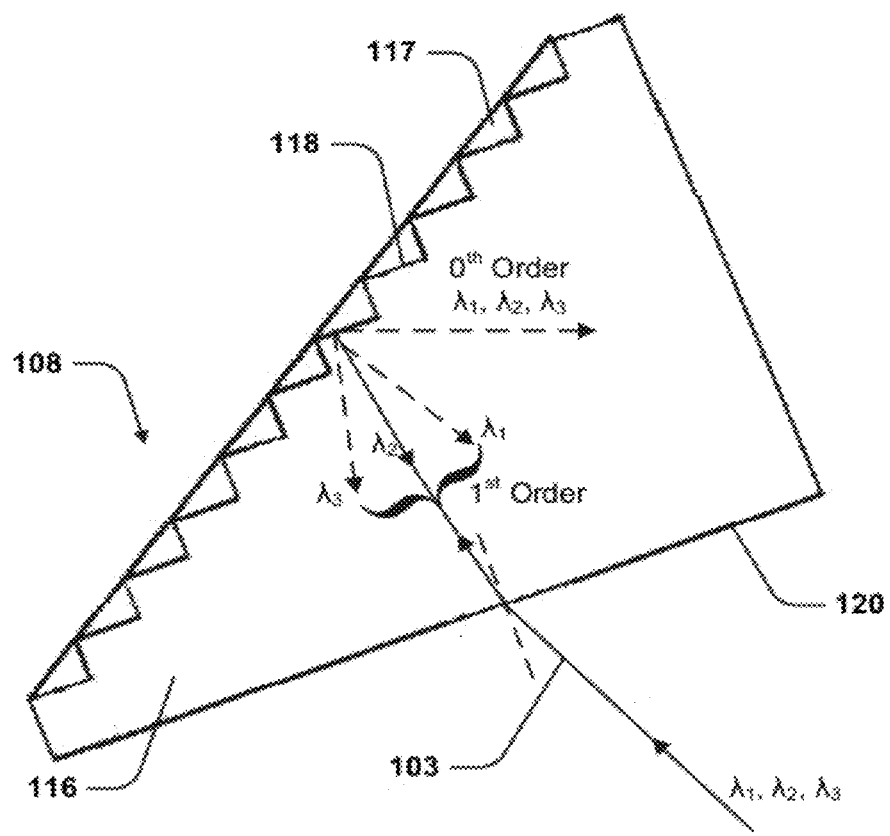
FIG. 3 is a plan view/ray diagram of a grism.

Referring now to FIG. 3, the grism 108 is a compound element including a first portion in the form of a prism 116 and second portion in the form of a diffraction grating 117. Together these portions form an integral optical grism element. The prism 116 defines two surfaces of the roughly triangular-shaped grism 108 and initially refracts the incoming optical beam 103 onto the grating 117, which defines the third surface of the grism 108. The diffraction grating 117 then angularly disperses the beam 103, this time into separate output diffraction orders. Any directly reflected beam forms a so-called zeroth order and is not wavelength separated. However, each higher order ($1^{st}$, $2^{nd}$ etc.) includes angularly dispersed wavelengths, thereby spatially separating each channel included in the optical beam 103.

In FIG. 3 the incident optical beam 103 includes, by way of example, three wavelength channels having respective wavelengths $\lambda_1$, $\lambda_2$, $\lambda_3$. It will be appreciated that the optical channel monitor 100 can receive optical beams 103 having a greater or fewer number of wavelength channels. Upon diffraction from the grating 117, the zeroth order (undispersed signal) is diffracted off the optical axis and out of the system. The first order diffracted signal is angularly dispersed according to wavelength. For clarity, the angles of diffraction are exaggerated in FIG. 3. By appropriate orientation of the MEMS mirror 106, a particular wavelength channel (in this case $\lambda_2$) is coupled back through the system where it is focused by the lens 104 into an output fiber 110 to be monitored.

It is noted that the prism 116 also, to an extent, angularly disperses the optical beam according to wavelength. However, this dispersion is small relative to the dispersion provided by the diffraction grating. Accordingly angular dispersion by the prism is not shown in FIG. 3. Furthermore, while the illustrated grism 108 is triangular in shape, it will be appreciated that other forms of grism can be implemented. Also, different designs of optical channel monitor 100 can be realised which couple wavelength channels of higher diffraction order ($2^{nd}$, $3^{rd}$ etc.) to the output port 110.

Figure 4:
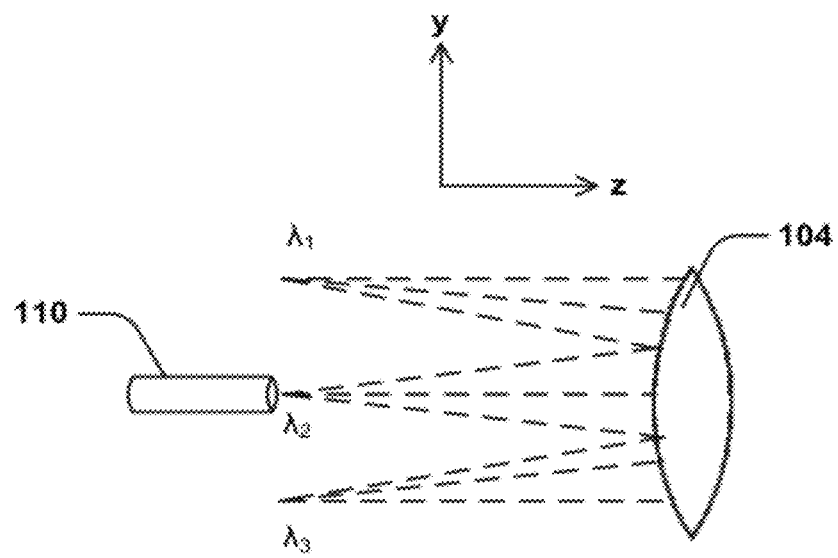
FIG. 4 is a ray diagram illustrating the spatial separation of wavelength channels in the horizontal dispersion plane.

Referring to FIG. 4, in certain configurations, one or more wavelength channels are coupled back through the optical system, albeit at slightly different angles. In this case, the lens 104 will focus each wavelength channel at different horizontal image points in the focal plane and only a single channel is coupled to an output port 110 at any one time.

The wavelength selectivity of the channel monitor 100 essentially defines a filter which filters out a selected wavelength channel for monitoring. The filter profile and therefore the spectral efficiency of the monitor 100 is, in part, controlled by the width of each beam incident on the grism 108, and in particular the blazed surface 118. In the present context, beam width refers to the width of an optical beam in the dispersion plane. A large-width beam being incident on a diffraction grating will produce a more well-defined diffraction pattern than a small-width beam. This effectively translates to a narrower line width filter pass band, providing better wavelength selectivity.

A conventional diffraction grating will have a different spectral performance depending on the spot size of the beam incident on the grating surface. The spot size is dependent upon the angle that the beam is incident on the blazed surface 118, as it is refracted by the prism portion of the grism 108. A beam incident at larger angles to the grating surface will produce a larger spot size and therefore provide better spectral performance than a beam incident at smaller angles. This performance variation with angle is undesirable in an optical channel monitor where deconvolution of the scanned spectrum is necessary.

With reference again to FIG. 2, this problem is overcome by orienting the grating 117 in the grism 108 with respect to the front surface 120 of the prism 116 in such a way that, during a full sweep of the MEMS mirror 106 as described in detail below, gradual increase of the beam size due to refraction on the surface 120 can be compensated by gradual decrease of the beam size incident upon the grating 117. Combined with the demand for a near Littrow diffraction condition for a given wavelength range to monitor, the above factors determine the range of angular incidence on the grism 108 to ensure that spectral performance of the optical channel monitor 100 remains substantially constant for each channel monitored.

Another advantage of the grism 108 is that the beam expanding properties of the prism portion 116 increases the width of the beam 103 incident on the grating portion 117, thereby providing increased wavelength resolution. Furthermore, the combination of both the dispersive and diffractive properties of the grism 108 also provides amplified angular wavelength separation in a plane of dispersion. These effects act to further reduce the distance required for reaching sufficient spatial separation of wavelength channels. Control over the spatial dispersion of each wavelength channel is set by selecting appropriate properties of the grism. Such properties include the prism material, orientation and the grating line profile of the diffraction grating. By using a grism having a high refractive index, the size of the grism, and therefore the overall optical system, can be reduced.

While in the preferred embodiment the grism 108 is formed of silicon, it will be appreciated that a suitable grism may be formed of other known materials including various optical glasses and crystals. Furthermore, the illustrated grism 108 utilizes a unitary prism 116. However, in alternative embodiments a compound prism comprising a combination of coupled prisms can be integrally formed into the unitary grism 108.

Turning to FIG. 3, in the preferred embodiment the grating is a blazed diffraction grating 117 having a blazed surface 118 and control of the output wavelength channel dispersion is performed by varying the angle that the beam is incident onto the blazed surface 118. However, it will be appreciated that in alternative embodiments other forms of diffraction grating are used, such as ruled-groove gratings.

Referring again to FIGS. 2 and 3, the wavelength channel selectivity provided by the MEMS mirror 106 will now be described. As explained above, appropriate direction of the optical beam 103 by the MEMS mirror 106 allows the coupling of a single optical channel into output optical fibers 110 for monitoring by the receiver 112. By selectively varying the face angle φ of the MEMS mirror 106 with respect to the grism 108, the angle at which the optical beam is incident onto the grism 108 is changed. Varying this angle consequently alters the angle at which each channel will be diffracted from the grism 108. Therefore, by orienting the MEMS mirror 106 at a predetermined angle φ with respect to the grism 108 in the horizontal dispersion plane, a specific wavelength channel can be monitored.

Movement of the MEMS mirror 106 is achieved by an associated precision control actuator. By driving the MEMS mirror 106 with a periodic input function, the individual wavelength channels are spatially swept across the output optical fibers 110 and coupled to the receiver 112, thereby monitoring each channel for a short time period. Continuous periodic sweeping allows each channel in the optical beam to be sampled periodically in a time-division manner.

In alternative embodiments, it will be appreciated that it is possible to implement other types of controllable reflectors. By way of example, in one embodiment a piezo-deflection mirror is used to selectively control the direction of the optical beam 103.

Figure 5:
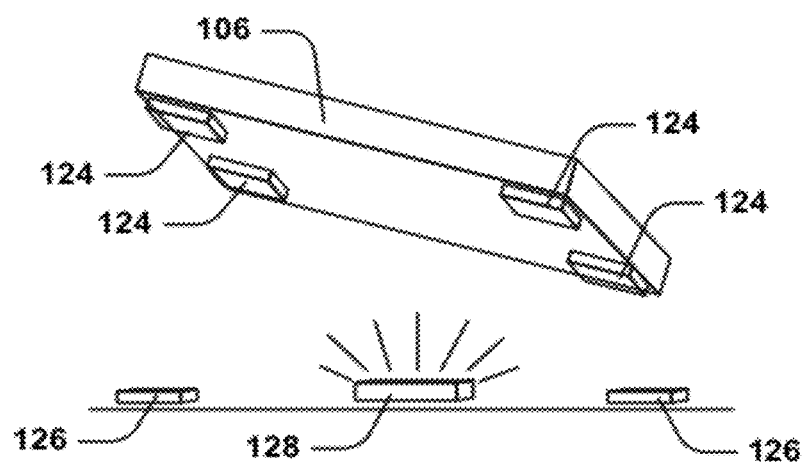
FIG. 5 is a perspective view of a calibration system for the MEMS mirror.

Calibration of the controlled position of the MEMS mirror 106 is achieved by directly controlling and measuring the physical orientation of the mirror in two dimensions. Referring now to FIG. 5, a monitoring system for the MEMS mirror 106 is shown, wherein the MEMS mirror is illustrated as being rectangular. This system includes four monitoring mirrors 124 located at spatially separated locations on the underside or backside of the MEMS mirror 106 and a plurality of corresponding optical detectors such as photodiodes 126. A monitoring signal is emitted from a Light Emitting Diode (LED) 128 which is reflected off each of the four monitoring mirrors 124 and received by the photodiodes 126. The amount of light detected by each photodiode 126 provides an accurate measure of the orientation of the MEMS mirror 106.

Figure 6:
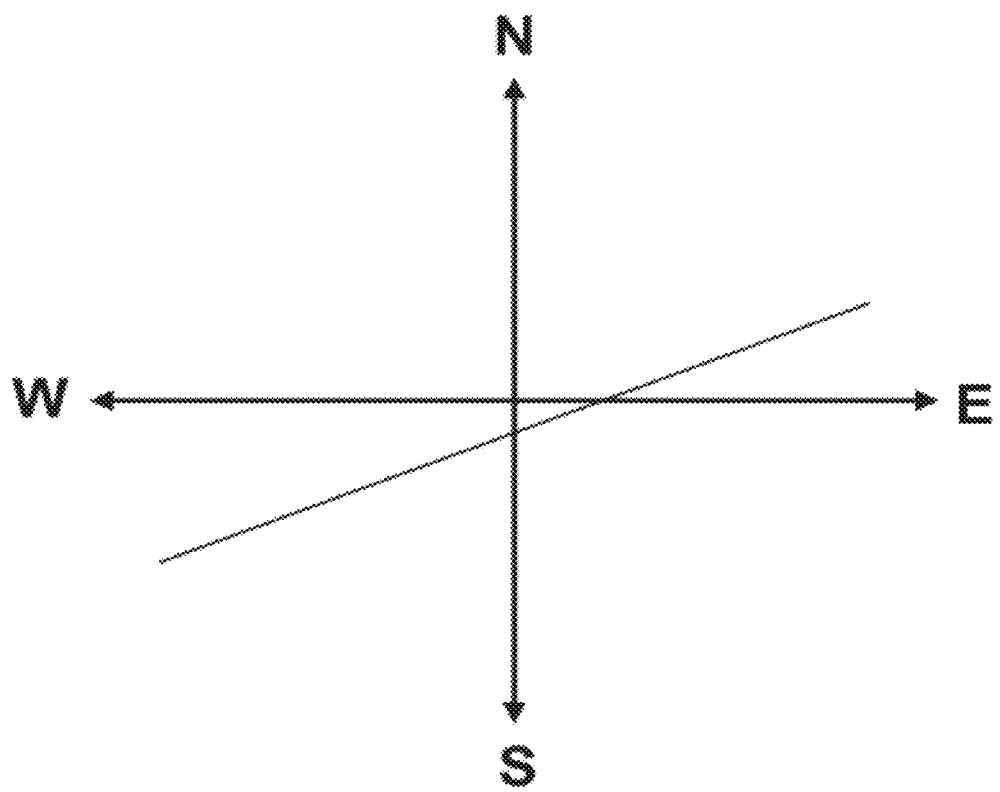
FIG. 6 is an example graph of an optimum MEMS mirror orientation curve, shown in East/North phase space.

Referring now to FIG. 6, with accurate knowledge of the mirror's orientation, an optimum orientation curve can be constructed by measuring one or more of the insertion loss, crosstalk, signal power and peak wavelength of signals from the receiver 112 at many different mirror orientations. This process is repeated for every port and the path which minimises crosstalk and insertion loss across all ports is selected as the optimum curve. An example optimum curve, which represents the ideal sequence of MEMS mirror angles, is shown in FIG. 6 as a path in East/North phase space.

When the control system deviates from the optimum curve, such as when mechanical vibrations occur, the actual orientation data is compared to the optimum orientation. With sufficient data sampling, data points deemed too far from the optimum curve can be omitted or flagged with a caution. Alternatively, suitable active interpolation or compensation can be applied to data depending upon the deviation in orientation of the MEMS mirror 106 from the optimum curve at their respective measurements.

In addition to the above calibration techniques, the MEMS mirror 106 can be programmed to perform a periodic dark current measurement. This is achieved by driving the MEMS mirror 106 far from the optimal orientation curve such that the optical beams are deflected far away from the output ports. In this manner, the only signal measured by the receiver is the intrinsic dark current of that device. Once determined, this dark current can be suitably compensated for in future measurements. Such a dark current measurement cycle can be programmed to be performed once every predetermined period, such as every half hour.

Before moving on from calibration, it is noted that each MEMS mirror 106 has a unique wavelength response function. That is, at certain wavelengths, the MEMS mirror 106 will produce lower insertion loss. The shape of the wavelength response function of a MEMS mirror may vary from unit to unit. Therefore, in some embodiments the shape of the wavelength response function is measured and factored into the calibration methods.

The operation of the optical channel monitor described so far has only related to a single input optical beam 103. Referring again to FIG. 2, the optical channel monitor 100 includes a pair of input fibers 102 and corresponding output fibers 110 stacked lineally vertically in the port displacement plane. The pairs of fibers are symmetrically disposed about a central optical axis 122 (z-axis) for coupling the optical beams between the input fibers 102 and output fibers 110. However, the ports need not be symmetrically disposed about the optical axis, as the MEMS mirror 106 can be oriented to compensate for this.

Figure 7:
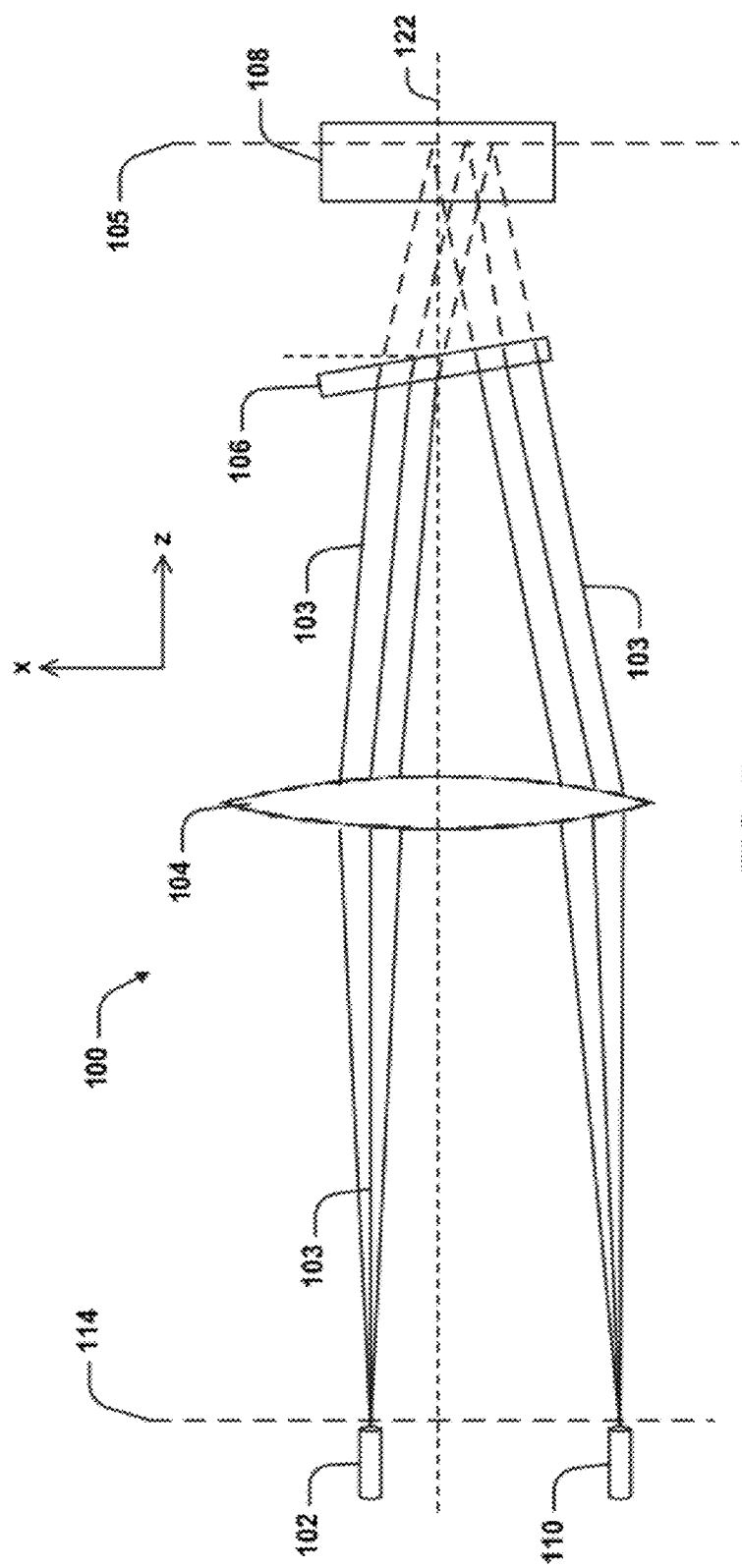
FIG. 7 is a schematic plan view of an optical channel monitor according to a second embodiment.

Referring to FIG. 7 an alternative embodiment is shown wherein a single input fiber 102 is configured to couple wavelength channels of an optical beam 103 into a corresponding output fiber 110 asymmetrically disposed about the optical axis 122. This is achieved by orienting the MEMS mirror 106 such that the beam 103 is incident onto the grism 108 at an appropriate angle to diffract a selected wavelength channel to the output port 110 as if it were located at a symmetric off-axis position. As such, diffracted wavelength channels of an input optical beam can be switched over a range of output positions in the vertical port displacement axis.

This functionality gives rise to the added capability to selectively switch an optical beam from a single input fiber 102 between one of a number of output fibers by appropriately adjusting the orientation of the MEMS mirror 106. By choosing suitable scanning frequencies in the dispersion plane and in the port displacement plane, the optical channel monitor can be configured to sequentially couple a single wavelength channel of an optical beam incident from a single input fiber 102 into each of a plurality of output fibers. However, as will be discussed below, a preferred operation of the optical channel monitor is to simultaneously couple a single wavelength channel from each of a plurality of optical beams, input from respective input fibers, into corresponding output fibers and scan the output wavelength channels over a full sweep of the MEMS mirror.

It will be appreciated that the output ports 110 need not be aligned in the port displacement plane. As the MEMS mirror 106 can selectively direct the spatially separated wavelength channels both vertically and horizontally, the input and output fibers can also be spatially separated in the horizontal dispersion plane, provided they are still spaced in the port displacement plane to substantially minimise return loss.

Figure 8:
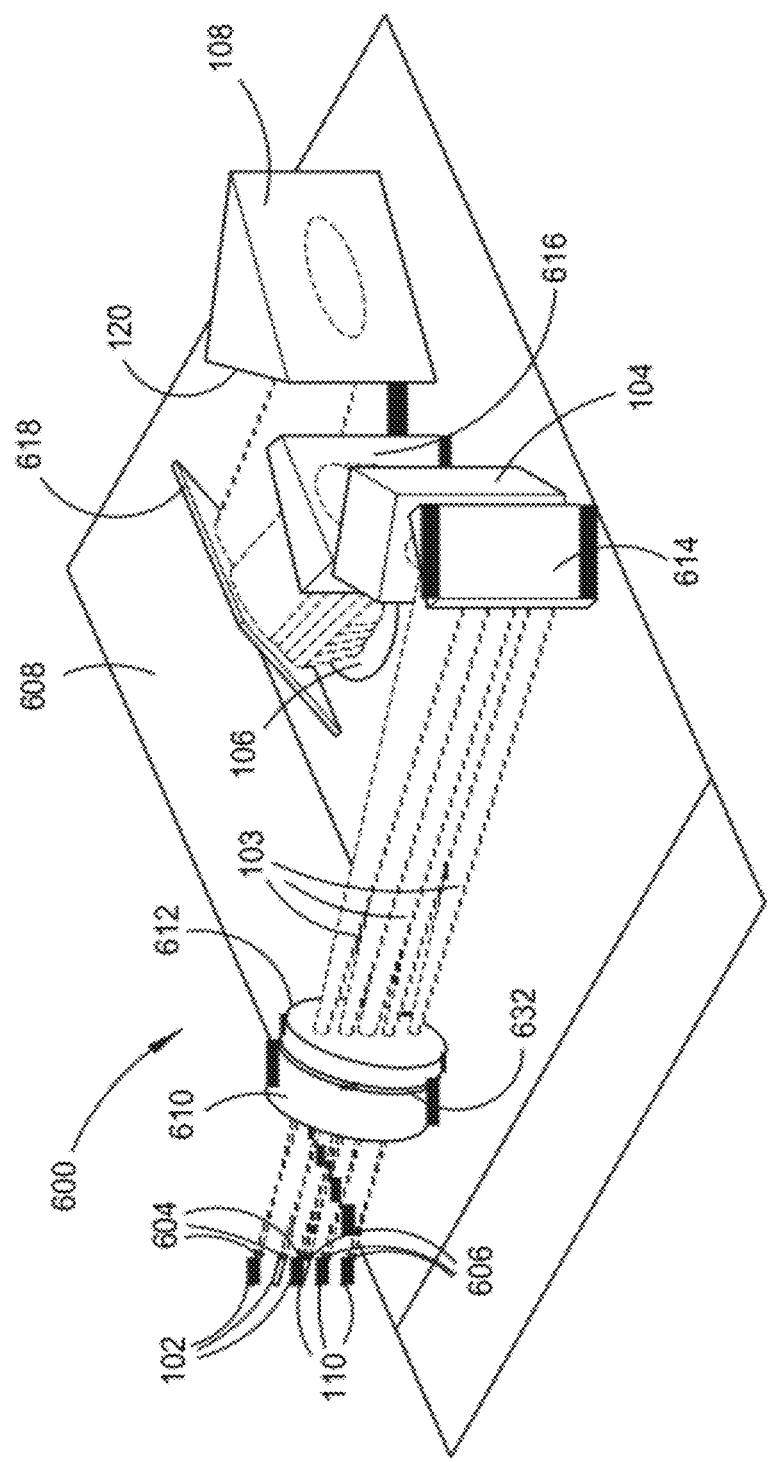
FIG. 8 is a perspective view of an optical channel monitor according to a third embodiment.
Figure 9:
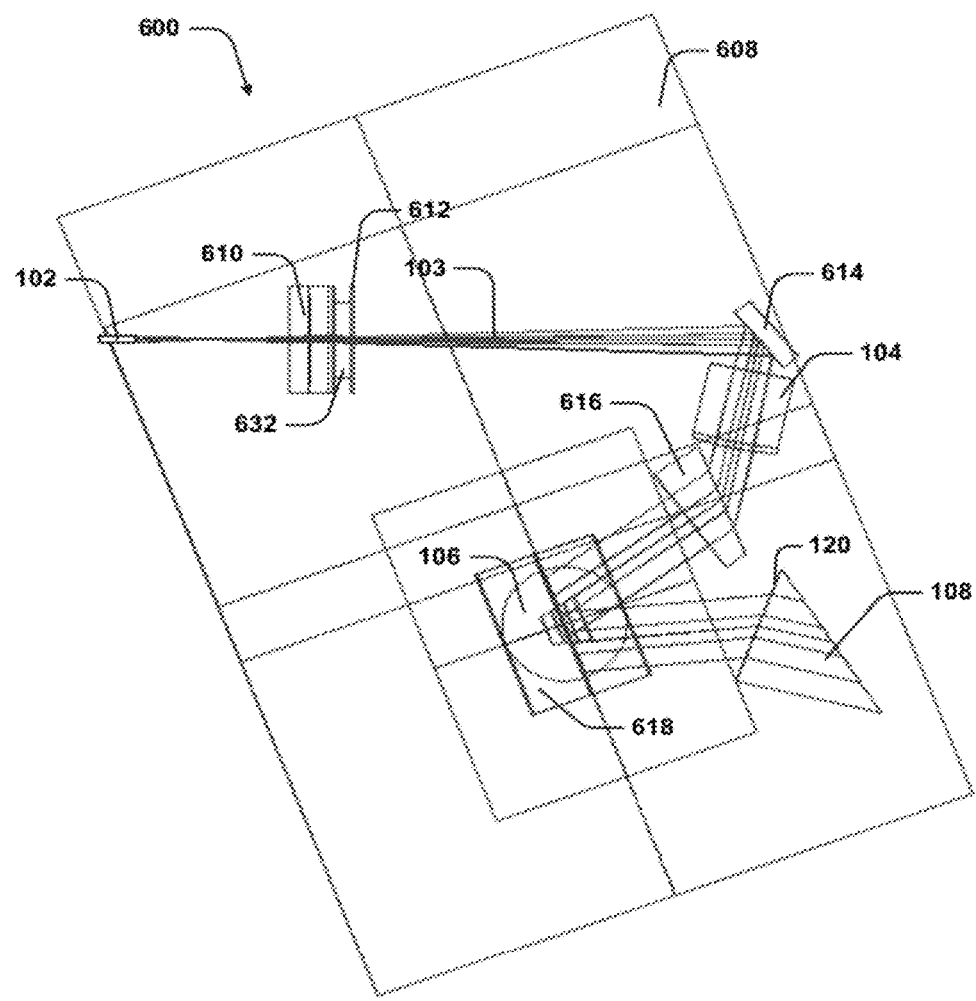
FIG. 9 is a plan view of the optical channel monitor according to the third embodiment.

Referring now to FIG. 8, there is provided another embodiment of an optical channel monitor 600 for which the operation and advantages of utilizing multiple inputs and outputs will be described. In this embodiment, corresponding features are given the same reference numerals. A plan view of the same embodiment is illustrated in FIG. 9.

In this embodiment, three optical beams 103 are input from respective vertically stacked input fibers 102 through an array of micro-lenses 604A to 604C. Corresponding output micro-lenses 606A to 606C couple the output wavelength channels into respective output fibers 110 that are linearly disposed below the input fibers. While this optical channel monitor includes and supports three simultaneous beams input respectively from the three input fibers, it will be appreciated that in other embodiments, differing numbers of input and output fibers can be arranged in alternative orientations to provide selected channel output to a desired receiver.

Figure 10:
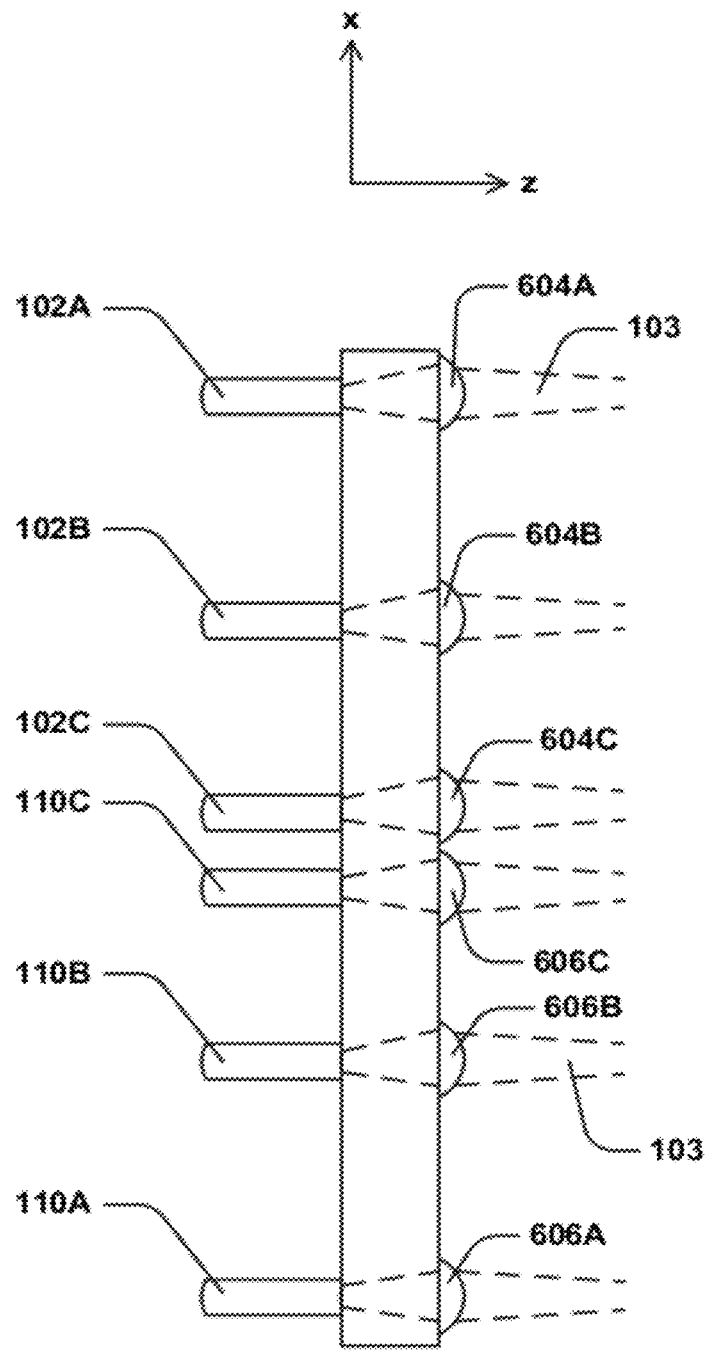
FIG. 10 is a side view of the input ports of an optical channel monitor having an array of micro-lenses for reducing the divergence of the incident beams.

FIG. 10 shows an expanded view of the micro-lens array. The micro-lenses 604 are attached to the ends of input fibers 102 and act to reduce the divergence of the beams 103 and increase the radial width of each beam incident onto the lens 104. At the opposite end, output micro-lenses 606 act to focus the diffracted wavelength channels into respective output fibers. The lens 104 is situated at a position such that its focal plane is located at the micro-lens array. The reduced beam divergence provided by the micro-lenses removes otherwise necessary size limitations of lens 104 and thereby further optimizes the performance of the optical channel monitor 600 for a given scale size.

Optical beams passing through uppermost micro-lens 604A are coupled out through the bottom micro-lens 606A. Similarly, signals originating from input micro-lens 604B and C are respectively coupled to output micro-lenses 606B and C.

Referring again to FIG. 8 the other optical elements forming the optical channel monitor 600 are mounted onto a substrate 608, which maintains the elements in a stationary stable configuration. The optical elements are preferably securely engaged to the substrate 608 by way of adhesive contact.

The optical beams 103 are first transmitted through a polarization dependent frequency shift (PDFS) compensator 610 and a polarization dependent loss (PDL) compensator 612, which will be described below. Next the beams 103 are incident on a highly reflective mirror 614 to confine the beams to the region of the substrate 608. In embodiments utilizing different configurations of optical elements, or where the spatial scale is not restricted, the mirror 614 can be omitted.

The deflected beams are incident on imaging lens 104 which, as described above, serves to collimate each beam 103 in the dispersion plane for later incidence on the grism 108. The lens 104 also collimates the beams 103 in the vertical port displacement plane but also reduces the spatial separation of each beam in the port displacement plane such that maximum use is made of the available surface area of the MEMS mirror 106 and grism 108. This beam confining that is performed in the port displacement plane provides more efficient utilization of the MEMS mirror and allows more input and output ports to be implemented into the optical channel monitor 600.

Next the beams traverse an expanding prism 616 which acts to spread the width of each beam 103 in the dispersion plane. Beams that are circular in diameter are therefore stretched into an elliptical shape with the long axis being horizontal. Increasing the width of the beam allows more surface area of the grism 108 to be utilized thereby producing a more efficient diffraction of light.

The spread beams are incident on a downwardly directed mirror 618, which directs the beams onto the MEMS mirror 106. In this embodiment, MEMS mirror 106 is circular in horizontal shape and is pivotally mounted to the substrate 608 for selectively steering the beams 103 both vertically and horizontally onto the grism 108. However, in alternative embodiments, the MEMS mirror 106 has different horizontal shapes including a square or rectangular shape. Following reflection off the MEMS mirror 106 the beams are reflected back onto the downwardly directed mirror 618 which directs them onto grism 108. The vertically separated beams are diffracted in the horizontal direction and a particular wavelength channel or diffraction order is coupled back through the lens-mirror system.

The MEMS mirror 106 is driven by a periodic input function so that it directionally scans each beam in the horizontal plane. At certain mirror positions a wavelength channel will be coupled back through the system into a corresponding output optical fiber 110, in a similar manner to that described above. The MEMS mirror 106 can also be rotated in the orthogonal direction such that the beams 103 are directed vertically. This allows beams from a given input fiber to be coupled into a predetermined output fiber 110 located above or below that input fiber.

In one embodiment, monitor 600 is bidirectional and reversible such that input fibers 102 and output fibers 110 are each able to either input or output optical signals. That is, input fibers are able to be used as output fibers and vice-versa. Further, in some embodiments, input and output fibers are disposed in an alternating odd-even arrangement such that input fibers are located adjacent output fibers and similarly output fibers are located adjacent input fibers. This arrangement has advantages associated with reducing cross-talk between adjacent fibers. In one further embodiment, the channel monitor 600 provides selectivity in which particular input and output ports are in use at any one time. This flexibility allows adjacent ports to be in use at alternate times such that cross-talk is reduced.

It will be appreciated that the particular configuration of optical elements illustrated in FIGS. 8 and 9 is selected to reduce the overall size of the system and fit the channel monitor onto the substrate 608. In another embodiment, the components are arranged in other configurations such as a more linear configuration.

Figure 11:
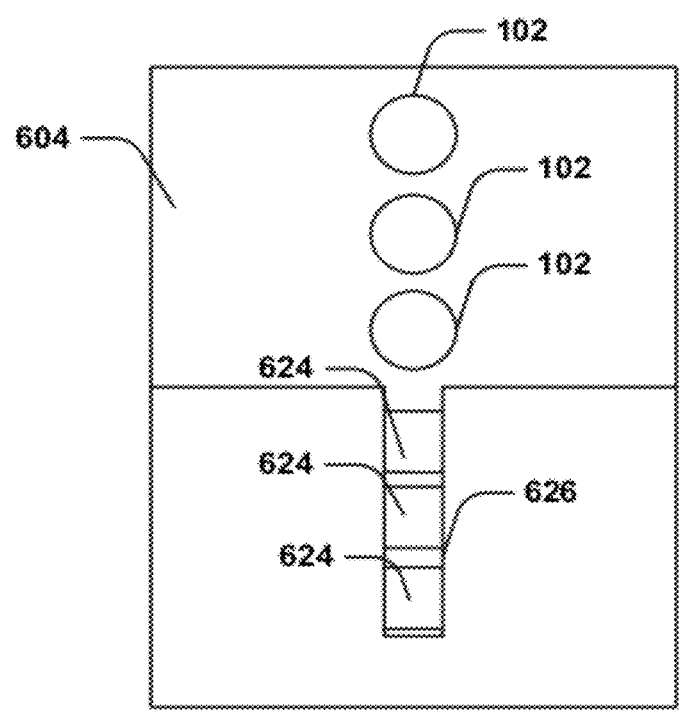
FIG. 11 is a front view of an alternative input/output arrangement of the optical channel monitor.

Referring to FIG. 11, an alternative embodiment of the fiber mount 604 of FIG. 8 is shown. Here the spatially separated wavelength channels from three equally spaced apart input fibers 102 are coupled directly to three respective optical detectors 624A-624C, such as avalanche photodiodes. Detectors 624 are located within a slit 626, which acts as a spatial filter to limit the width of the beam incident onto detectors 624. One or more slits may also be implemented in front of input or output optical fibers such as in the embodiment of FIG. 8.

In traversing the optical system, each beam may experience optical phenomena that degrade the quality of the signal detected. One such phenomenon is polarization dependent loss (PDL). This is differential signal attenuation experienced between different polarization states due to the non-isotropic nature of various optical media. This effect is wavelength dependent and is particularly prominent at high data rate transmission. Compensating for PDL is particularly important in an optical channel monitor as the wavelength dependence of PDL imposes a bias on the measurements of certain measured wavelength channels. Incorporating suitable PDL compensation into the channel monitor allows the constraints of certain optical elements, such as the silicon grism 108, to be relaxed.

PDL is compensated for by introducing a PDL compensator 612 in the form of a walk-off crystal and quarter-wave plate combination, into the path of the optical beams 103. The walk-off crystal spatially separates each optical beam into its constituent orthogonal polarization components. The quarter-wave plate acts to circularly polarize the separated polarization components of each optical beam 103 prior to their propagation through channel monitor 600. This PDL compensator 612 converts an arbitrary polarized beam into two oppositely oriented (one left hand and one right hand) circularly polarized beams. In a circularly polarized state, the electric field vectors spend equal time in each orientation and therefore experience equal losses. On the return trip, after a second pass of the quarter-wave plate, the walk-off crystal spatially recombines the components back into a single output beam. The resulting orthogonal polarization components have spent equal time in the same polarization states and have therefore experienced substantially the same loss. The PDL compensator 612 also compensates for any polarization dependent delays present in the system A second optical phenomenon that may be experienced in an optical channel monitor is polarization dependent frequency shift (PDFS). This effect arises when, due to PDL compensation, two polarization states from an input fiber traverse different optical paths, which can be separated in both the dispersion and port displacement planes. The incident angle of an optical beam onto the grism 108 in the vertical plane, as well as the horizontal plane, leads to a change in the angle of diffraction of a particular wavelength. Therefore, in traversing different optical paths, the constituent polarization components are incident onto the grism 108 at different angles, which results in a spatial shift between the two polarization states of the same wavelength at the output fiber. As such, each wavelength channel is coupled into the receiver 112 at different MEMS mirror tilt angles dependent on the polarization state, which degrades the performance of the optical channel monitor 600. Accordingly, suitable PSFS compensation is desired.

Referring briefly again to FIG. 1, it can be seen that beams traversing different input/output fiber paths are incident onto the grism 108 at different angles. In particular, beams traversing a path from the outer input/output fiber pairs are incident onto the grism 108 at larger angles than those closer to the optical axis 122. Therefore, with multiple inputs and outputs preset, PSFS cannot be simultaneously compensated for through alignment only. Therefore, separate PSFS compensation is important.

Figure 12:
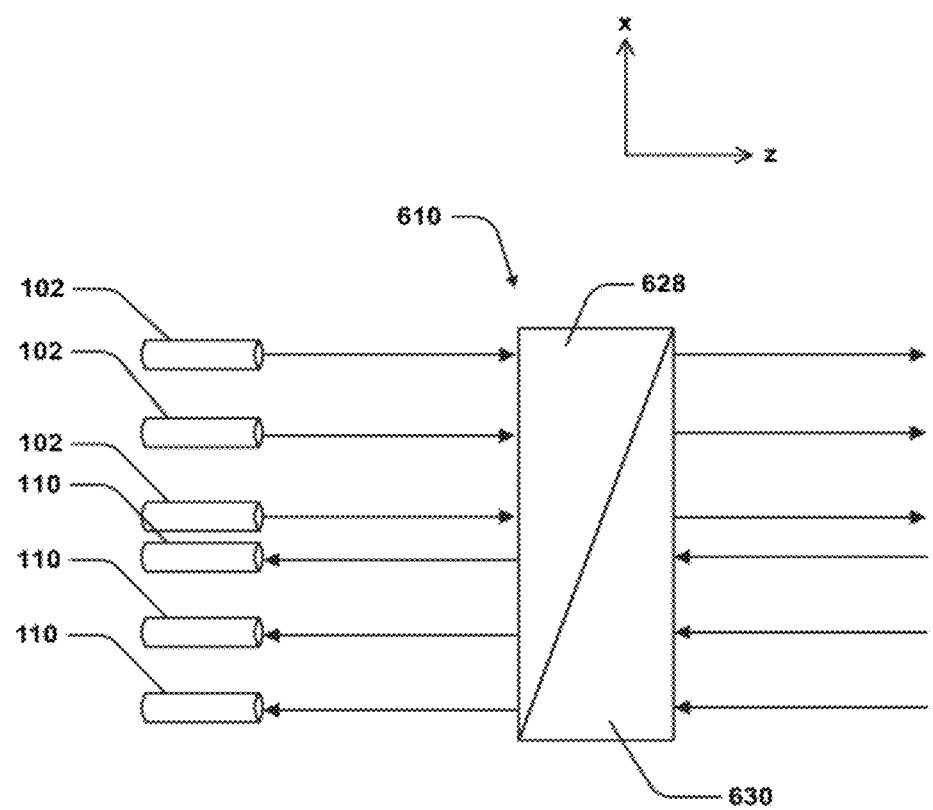
FIG. 12 is a side view of a pair of complementary birefringent wedges forming a PDFS compensator.

Referring now to FIG. 12, there is illustrated a PDFS compensator 610 in the form of a pair of complementary birefringent wedges 628 and 630. These wedges have complementary tapered widths in the vertical port separation plane and opposing birefringent properties providing opposing walk-off directions in the horizontal dispersion plane. The wedges 628, 630 are arranged such that a horizontally polarized beam traversing along the center of the compensator 610, where the widths of wedges 628 and 630 are equal, exhibits zero total horizontal displacement. Similarly, a horizontally polarized beam traversing along a vertically lower region of the compensator 610, where the width of wedge 630 is greater than the width of wedge 628, is displaced to the right of its propagation direction.

Figure 13:
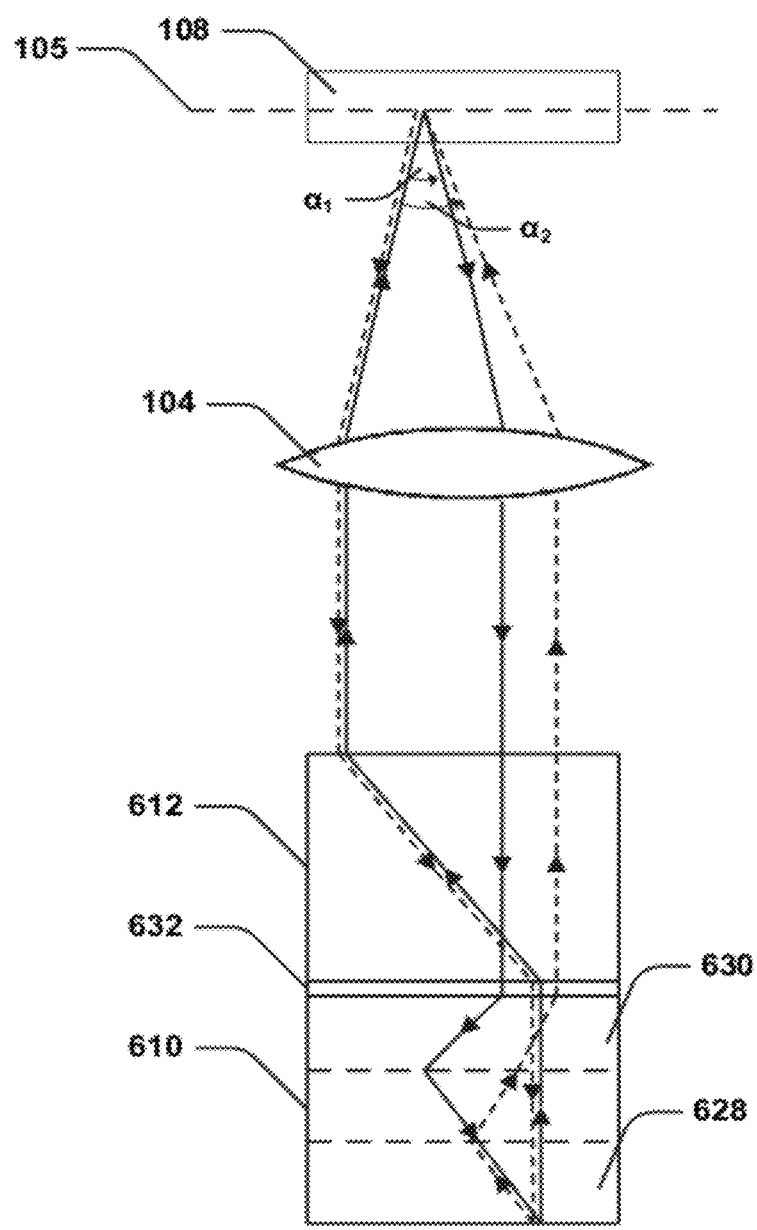
FIG. 13 is a simplified schematic plan view of the optical channel monitor according to the third embodiment, tracing the forward and return paths of two orthogonal polarization states of the same wavelength for a widely spaced apart input/output fiber pair.

To illustrate the implementation of the PDL and PDFS compensation in the optical channel monitor, FIG. 13 shows a ray diagram tracing the forward and return paths of two orthogonal polarization states of the same wavelength for a widely spaced apart input/output fiber pair. Here the MEMS mirror 106 is omitted and the grism is simplified for ease of understanding. A vertically polarized component is indicated by the solid line and a horizontally polarized component is indicated by the dashed line.

Turning first to the path of the initially vertical component (solid line), this component passes initially through the PDFS compensator 610 unaffected. A half-wave plate 632 rotates the vertical component into the horizontal orientation before incidence onto the PDL compensator 612, which walks the beam to the left. The lens 104 collimates the beam onto the grism 108 which diffracts the beam by angle $\alpha_1$. On the return path, the beam is collimated by the lens 104 and passed through PDL compensator 612 unaffected. As the beam is now horizontally polarized it is walked to the left by wedge 630 and then to the right by wedge 628. Due to the greater thickness of wedge 628 at the level of the output port, the net walk is to the right, thereby re-aligning the beam with its initial path in the dispersion plane.

Referring still to FIG. 13, focus is now directed to the path of the initially horizontal component (dashed line). This component is initially walked left by wedge 628 and then to the right by wedge 630. The larger width of wedge 630 at the level of the input port provides a net walk to the right. The beam is rotated into the vertical orientation by the half-wave plate 632 where it passes through the PDL compensator 612 unaffected. The lens 104 collimates the beam onto the grism 108 where it is diffracted by angle $\alpha_2$. The return path of this beam is coincident with the forward path of the orthogonal component, as illustrated in FIG. 13.

Alternative Embodiments

The wavelength channels are spatially separated in a dispersion plane, exemplified here as the horizontal plane. However, it will be appreciated that in other embodiments the grism 108 spatially disperses the wavelength channels in orientations other than the horizontal dimension.

In the illustrated embodiments, the channel monitor is separate from the receiver 112, which is coupled to the output ports 110. However, it will be appreciated that in other embodiments the receiver 112 can be implemented within the channel monitor.

While in the illustrated embodiments separate input and output fibers are used, in an alternative embodiment the same fibers are used as both input and output ports to the receiver 112. This input/output coupling can occur simultaneously due to the use of the imaging lens 104, which defines a focal plane 114 in which the returned signals can be received. In this alternative embodiment, a three port optical circulator is used to separate the signals propagating in opposite directions. In this manner, signals input from an external optical system are restricted from propagating directly to the receiver 112 and signals returned from the channel monitor 100 are restricted from propagating back to the external optical system.

In one embodiment, the channel monitor includes a plurality of input fibers and a single output fiber. Mirror 106 is driven by a specific periodic scanning function to tilt in both the horizontal and vertical planes such that individual wavelength channels from alternating ones of the input fibers are sequentially coupled to the output fiber. By way of example, in a monitor having 3 input ports respectively inputting signals (P1, P2, P3), each having 3 wavelength channels ($\lambda 1, \lambda 2, \lambda 3$), mirror 106 is configured to couple the following sequence of channels to the output fiber: P1$\lambda$1, P2$\lambda$1, P3$\lambda$1, P1$\lambda$2, P2$\lambda$2, P3$\lambda$2, P1$\lambda$3, P2$\lambda$3, P3$\lambda$3 in time. In other embodiments, different sequences of coupling are provided. It will be appreciated that this two-dimensional tilting of mirror 106 allows monitoring of channels from substantially any two-dimensional array of input and output fibers or ports.

In one embodiment, the channel monitor is in communication with an active compensating system for selectively compensating the optical beams following the monitoring of specific characteristics of each channel. For example, if after a channel has been monitored it is determined that a specific wavelength channel has lower power than the adjacent multiplexed channels, amplification can be provided to this channel downstream of the monitor.

While in the above illustrated embodiments, the grism 108 is described using a reflection diffraction grating, it will be appreciated that a transmission diffraction grating can also be implemented. However, such embodiments would necessarily require a larger substrate and therefore be larger in scale size.

It will be appreciated that in alternative embodiments, different combinations and configurations of optical elements are implemented to manipulate the optical beam between the input ports 102, MEMS mirror 106, grism 108 and output ports 110. For example, in one embodiment it is preferable to reduce the beam waist prior to incidence onto the MEMS mirror 106 but increase the beam waist prior to incidence onto the grism 108.

CONCLUSIONS

It will be appreciated that the above disclosure provides an improved optical channel monitor. It will also be appreciated that the disclosure provides a compact optical channel monitor that efficiently incorporates multiple input/output ports with reduced system complexity.

By implementing a grism 108 in the unique configuration described above, the disclosed optical channel monitor reduces the scale problem that exists in conventional imaging system optical channel monitors. In particular, the scale size is reduced by providing a single diffraction in the focal plane of a compact imaging lens 104. That is, the beam width control of the prism 116 within of the grism 108 allows a compact lens 104 with small focal length to be used without significantly affecting the spectral performance of the device.

Furthermore, the use of an imaging system, as opposed to a non-imaging system, provides simplicity in incorporating multiple inputs and outputs. Specifically, the disclosed optical channel monitor includes a single primary imaging lens 104 defining a single focal plane for imaging multiple beams simultaneously. This allows multiple input and output ports to be easily implemented by placing them in the focal plane of the lens 104. That is, no additional lenses or optical elements are required to add further ports. This single lens design also facilitates the use of the input fibers 102 as output ports 110, thereby providing a simple, more compact design.

Multiple ports can be accommodated in the optical channel monitor 600 by converging the beam paths in the port displacement plane onto the grism 108. This results in more efficient utilization of the area of the MEMS mirror 106 and allows more input/output ports to operate simultaneously.

The grism 108 possesses advantageous beam expanding properties which provides increased wavelength resolution when compared to a typical diffracting or dispersing element. Furthermore, the combination of both the dispersive and diffractive properties of the grism 108 also provides amplified angular wavelength separation in a plane of dispersion. These effects can reduce the distance required for reaching sufficient spatial separation of wavelength channels, which is particularly advantageous for facilitating switching in the optical channel monitor.

INTERPRETATION

Throughout this specification, use of the term "element" is intended to mean either a single unitary component or a collection of components that combine to perform a specific function or purpose.

It should be appreciated that in the above description of exemplary embodiments, various features are sometimes grouped together in a single embodiment, Fig., or description thereof for the purpose of streamlining the disclosure and aiding in the understanding of one or more of the various inventive aspects. This method of disclosure, however, is not to be interpreted as reflecting an intention that the claimed optical channel monitor requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment.

Furthermore, while some embodiments described herein include some but not other features included in other embodiments, combinations of features of different embodiments are meant to be within the scope of the disclosed optical channel monitor, and form different embodiments, as would be understood by those skilled in the art. For example, in the following claims, any of the claimed embodiments can be used in any combination.

In the description provided herein, numerous specific details are set forth. However, it is understood that embodiments may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical, electrical or optical contact, or that two or more elements are not in direct contact with each other but yet still co-operate or interact with each other.

Thus, while there has been described what are believed to be the preferred embodiments, those skilled in the art will recognize that other and further modifications may be made thereto without departing from the spirit of the disclosed optical channel monitor, and it is intended to claim all such changes and modifications as fall within the scope of the disclosure. For example, steps may be added or deleted to methods described within the scope of the disclosure.

We claim:

1. An optical channel monitor including:
    a plurality of input ports disposed in a first dimension, each input port being adapted for transmitting an optical beam including a plurality of individual wavelength channels;
    an optical power element collimating each optical beam and angularly converging the beams, in the first dimension, to a focal plane, the optical power element having a focal length $F_1$;
    a wavelength dispersion element spatially separating the wavelength channels of each optical beam in a second dimension;
    a selectively movable micro-electromechanical (MEMS) mirror that simultaneously directs each optical beam onto the wavelength dispersion element at a predetermined angle in the first dimension; and
    a plurality of output ports disposed in the first dimension for receiving and outputting at least one spatially separated predetermined wavelength channel of each optical beam for detection of one or more characteristics of each predetermined wavelength channel;
    wherein the optical power element is centrally disposed at a distance equal to the focal length $F_1$ from both the input ports and the wavelength dispersion element such that a predetermined wavelength channel of each optical beam is simultaneously coupled to a predetermined output port; in the first dimension, the optical beams are collimated and converged onto the wavelength dispersive element and the predetermined wavelength channels are focused into the input/output ports; and in the second dimension, the optical beams are collimated onto the wavelength dispersive element and the predetermined wavelength channels are focused into the input and output ports.

2. An optical channel monitor according to claim 1 wherein the wavelength dispersion element is a reflective grism.

3. An optical channel monitor according to claim 2 wherein the grism is oriented with respect to the MEMS mirror such that a surface area of the wavelength dispersion element that is illuminated by an optical beam in the second dimension remains constant upon movement of the MEMS mirror.

4. An optical channel monitor according to claim 1 wherein the MEMS mirror is disposed at a position in a converging focal path of the optical power element wherein the spatial separation of the optical beams is reduced.

5. An optical channel monitor according to claim 1 wherein at least a subset of the output ports include optical detectors and optical slits.

6. An optical channel monitor according to claim 1 wherein the MEMS mirror is selectively rotatable to selectively sweep the wavelength channels across the output port in the second dimension.

7. An optical channel monitor according to claim 6 wherein the MEMS mirror is driven at a predetermined frequency to periodically sweep each wavelength channel in the second dimension.

8. An optical channel monitor according to claim 1 wherein the MEMS mirror is selectively rotatable to selectively couple wavelength channels into a desired output port in the first dimension.

9. An optical channel monitor according to claim 1 including an optical receiver coupled to each output port for receiving a predetermined wavelength channel and detecting one or more predetermined characteristics of that channel.

10. An optical channel monitor according to claim 1 wherein each input port and output port includes a respective micro-lens for reducing the divergence and increasing the radial width of each incident optical beam.

11. An optical channel monitor according to claim 1 including a walk-off crystal and a quarter-wave plate for compensating for polarization dependent loss.

12. An optical channel monitor according to claim 1 including a complementary pair of tapered birefringent wedges for compensating for polarization dependent frequency shifts.

13. An optical channel monitor according to claim 12 wherein the birefringent wedges are tapered in width in the first dimension and have opposing birefringent properties thereby to realign polarization states of a particular wavelength that have been spatially separated by different angles in the second dimension.

14. An optical signal monitoring device for monitoring characteristics at predetermined wavelengths of an optical input signal, the device including:
    at least one input port projecting a first input optical signal having multiple channels encoded as different wavelengths;
    an optical power element that angularly converges the projected optical signal in a first switching dimension and that collimates the projected optical signal in a second dispersion dimension, thereby producing an optical power element output signal including the different wavelengths, the optical power element having a focal length $F_1$;

a dispersion element dispersing the different wavelengths of the optical power element output signal in said second dispersion dimension, thereby producing a dispersion element output signal; and an output signal monitoring element monitoring the optical power of at least one of the different wavelengths of the dispersion element output signal, wherein the optical power element is centrally disposed at a distance equal to the focal length $F_1$ from both the at least one input port and the dispersion element;

wherein, in the first switching dimension, the optical power element collimates and converges the optical power element output signal onto the wavelength dispersive element and also focuses the at least one different wavelength of the dispersion element output signal into the output signal monitoring element; and wherein, in the second dispersion dimension, the optical power element collimates the optical power element output signal onto the dispersion element and focuses the at least one different wavelength of the dispersion element output signal into the output signal monitoring element.

15. A device as claimed in claim 14 further including:

a variable transmission direction element modifying the projection direction of the optical power element output signal in a controlled manner thereby causing different wavelengths of the dispersion element output signal to be emitted onto the output signal monitoring element.

16. A device as claimed in claim 15 wherein said variable transmission direction element comprises a rotatable mirror.

17. A device as claimed in claim 14 wherein said dispersion element includes a grism having a diffraction grating formed on a first surface, with said optical power element signal being diffracted by the diffraction grating after transmission through said grism.

18. An optical channel monitor according to claim 1 wherein each said input port and output port includes a respective micro-lens.

* * * * *